United States Patent [19]

Vadasz

[11] Patent Number: 4,790,877

[45] Date of Patent: Dec. 13, 1988

[54] SILICONE EMULSION POLISHES AND THEIR FORMULATION

[75] Inventor: Jeffery L. Vadasz, Dunedin, Fla.

[73] Assignee: Rojef Distributors, Inc., St. Petersburg, Fla.

[21] Appl. No.: 83,972

[22] Filed: Aug. 11, 1987

[51] Int. Cl.$^4$ ............................ C09D 3/02; B32B 9/06
[52] U.S. Cl. ........................................... 106/3; 106/4; 428/447; 428/450
[58] Field of Search ................ 106/3, 4, 11; 428/447, 428/450

[56] References Cited

U.S. PATENT DOCUMENTS

| | | | |
|---|---|---|---|
| 2,856,297 | 10/1958 | Green | 106/3 |
| 2,955,047 | 10/1960 | Terry | 106/3 |
| 3,460,981 | 8/1969 | Keil | 106/13 |
| 3,576,779 | 4/1971 | Holdstock | 106/11 |
| 4,013,475 | 3/1977 | Liebowitz | 106/10 |
| 4,614,612 | 9/1986 | Reilly et al. | 252/541 |

*Primary Examiner*—Theodore Morris
*Attorney, Agent, or Firm*—Charles A. McClure

[57] ABSTRACT

Wax-free silicone emulsion compositions for polishing vehicles inside and out. One principal and preferably a couple secondary polysiloxanes in emulsion form receive a mixture of lower alkanol and citrus juice in a preferred formulation of polish composition, which can be wiped on to dry streak-free without dry wiping.

34 Claims, No Drawings

SILICONE EMULSION POLISHES AND THEIR FORMULATION

TECHNICAL FIELD

This invention relates to silicone emulsion compositions and to their formulation, especially wax-free polishes for vehicles.

BACKGROUND OF THE INVENTION

Anyone who has ever polished the exterior of an automobile knows how much physical effort and application time are required, notwithstanding an advertised ease of application or portraits of smiling users on the polish label. Boats and airplanes are even worse, as they have more surface area and are harder to reach.

First, the vehicle to be polished must be washed and dried. Then, not only does the polishing liquid, emulsion, or paste have to be applied by hand onto the finish of such vehicle to dry, but numerous streaks and swirls of the dried excess must be removed by dry wiping over essentially the entire surface already covered.

The prior art features U.S. Pat. No. 4,600,436 to Traver et al. (General Electric Co.) and others mentioned therein; van der Linde U.S. Pat. No. 4,398,953 (Borden, Inc.); Martin 3,960,575 (SWS Silicones Corp.); and Duncan 3,814,710 (ICI).

Although otherwise represented by the purveyors of polishing compositions, the durability of the resulting gloss or shine seems to correlate fairly well with how much effort, not to say exertion, was required of the applier of the polish during its application. An obvious need exists for an easier and simpler alternative to the present method of keeping up the appearance of the family car or other vehicle. It also would be helpful if an identical polish could be used inside, as well as out.

STATEMENT OF THE INVENTION

A primary objective of the present invention is to minimize the time and effort required to impart a high gloss to the finish of practically any vehicle exterior surface.

Another object of this invention is to shine the windows of the vehicle with the same polishing composition, inside and out.

A further object of the invention is to enable the smooth interior surfaces of the vehicle to be shined likewise, In general, the objects of this invention are accomplished by means of a largely silicone emulsion polishing composition. More particularly, such composition is essentially wax-free.

Other objects of this invention, together with methods and means for accomplishing the various objects, will be apparent from the following description of a preferred embodiment of it, which is presented here by way of example rather than limitation.

DESCRIPTION OF THE INVENTION

No wax or equivalent material is included in the polishing composition of this invention. Exclusion of waxes renders the polish easier to apply, free from streaks after application, and applied in only a single wet wiping without any dry wipe at all.

The polishing composition of the present invention is built about at least one silicone polymer to the extent of several to about ten percent. More particularly, except for water, which is the preponderant ingredient, the polishing composition of this invention consists mainly of polydimethylsiloxane, in the form of an aqueous emulsion, at a concentration of, say, 60%. An example of such a composition is readily available from GE (i.e., General Electric Company) as SM 2163 Silicone Emulsion, having a maximum viscosity of 2500 cps at 25° C. and a density of 8.25 pounds per gallon (about 1.0 gram per cc). Such silicone polymer—apart from the water in the emulsion—is useful according to this invention in a concentration of from as little as several percent to as much as about a half dozen percent of the total final product, which is itself about 70 to 80 percent water overall.

Preferably also, in the interest of durability of the shine resulting from use of the polishing composition of this invention, one or more reactive silicones are included. An example of such a composition is an amine-functional silicone polymer. Such polymer can be cured by cross-linking internally and/or with other polymers via available reactive groups, such as alkoxy, carboxy, or hydroxy, especially when exposed to sun and air. A particular example of a suitable amine-functional silicone is GE's SM 2059, available at 20 cps and at a specific gravity just slightly less than that of water, in the form of an aqueous emulsion at, say, 35% concentration. Such polymer is optionally included in the polishing composition of this invention to an extent of one or two tenths percent to one percent (taken water-free)—or about ½ to 1½ percent as starting emulsion.

An additional silicone polymer, specifically reactive with an amine-functional silicone polymer, may be added in like amount for enhancement of the durability of the resulting shine. Suitable for such purpose is GE's SM 2079, which is available at 100–500 cps and the specific gravity of water in an aqueous emulsion of 60%.

In formulation of the polishing composition of this invention each silicone polymer used (preferably in pre-emulsified form) is mixed into water, conveniently containing up to several tenths of a percent of an emulsifying agent before adding other components.

Added to the resulting emulsion is enough lower alkanol to be about 10 to 15 percent of the eventual total, and enough of a weakly acidic organic composition to make up about several to a half dozen percent. The alcohol is preferably isopropanol, and the acid is preferably concentrated lemon or other citrus juice. A preferred formulation approximates the mean of the stated ranges of the respective ingredients. The functions of the respective silicones have been suggested above and are generally understood. The alcohol acts in pertinent part as an evaporating and levelling agent, whereas the citric acid (and/or resultant ester) functions as a cleaning and anti-spotting or de-streaking agent. Altogether the selected components coordinate with one another in performing their respective functions and integrating the desired end result.

As an example, water (about 75 parts) containing a couple hundredths part of conventional surfactant has mixed successively thereinto a half dozen parts of such polydimethylsiloxane emulsion and one part each of emulsions of such amine-functional silicone polymer and such mutually reactive silicone polymer. A separately prepared mixture of a dozen parts of isopropanol and several parts of lemon juice concentrate (itself several times juice strength) is added to the foregoing mixture. With thorough mixing, makeup water is added to bring the total to 100 parts of an essentially homogeneous emulsion.

Experience shows that the polishing composition of the present invention can be wiped onto the finish of a vehicle and allowed to dry, whereupon it provides a high gloss without buffing. Washing or other precleaning is not necessary except to remove accumulated solids or sticky materials. The resulting shine is not affected adversely by a rain shower and normally will last for weeks without further attention. It endows a polished vehicle with a desirably "wet" look, such as usual on a showroom floor but not often later.

Moreover, the polishing composition of this invention is also suitable for use on the glass of windows and mirrors, as well. It is very effective in removing the haze or cloudiness that often obscures the surface of glass. It also is effective on vinyl and similar plastic-covered surfaces such as often are found inside or outside automobiles and other vehicles.

Benefits of using the polishing composition of this invention have been mentioned above and will become apparent to persons who undertake to use it. Components and their formulation into such polish have been prescribed, but variations in parts or steps may be employed while retaining some or many of the benefits of this invention—which itself is defined in the following claims.

I claim:

1. Wax-free buffing-free vehicle polish composition, comprising an aqueous mixture including
   at least one silcone polymer to the extent of several to about a half dozen percent, and
   citrus juice to the extent of at least several percent, and
   water-miscible lower alkanol to the extent of ten to twenty percent.

2. Vehicle polish composition according to claim 1, in the form of an emulsion.

3. Vehicle polish composition according to claim 1, wherein the silicone portion of the aqueous mixture comprises also in minor part a cross-linking amine-functional silicone polymer.

4. Vehicle polish composition according to claim 3, wherein the silicone portion of the aqueous mixture comprises also in minor part a silicone polymer having alkoxy, carboxy, or hydroxy substituents reactive with such amine-functional silicone polymer.

5. Vehicle polish composition according to claim 1, wherein the lower alkanol comprises isopropanol in major part.

6. Vehicle polish composition according to claim 1, which comprises also in minor part an organic acid.

7. Vehicle polish composition according to claim 6, which comprises lemon juice to the extent of at least several percent.

8. In a silicone-containing polish comopsition for vehicles, the improvement comprising at least several percent of lemon juice plus the characteristic of drying to a wet look when wiped onto such a vehicle.

9. Vehicle polish composition according to claim 8, wherein the lemon juice is present several times concentrated and equal to from about half of the silicone percentage to about the same as the silicone percentage.

10. Vehicle polish composition according to claim 8, including a water-miscible alkanol to the extent of at least about twice the silicone percentage.

11. Vehicle polish composition according to claim 10, wherein the alkanol comprises isopropanol in substantial part.

12. Vehicle polish composition according to claim 10, wax-free.

13. Vehicle polish composition according to claim 12, in the form of an emulsion.

14. Vehicle polish composition, made up of water in major part, silicone aqueous emulsion to the extent of about 5 to 10 percent, water-miscible alkanol to the extent of about 10 to 20 percent, and citrus juice to the extent of at least about several to a half dozen percent.

15. Vehicle polish composition according to claim 14, wherein the alkanol comprises isopropanol in at least major part.

16. Formulating a polish composition, comprising the steps of
   adding about 5 to 10 parts of aqueous emulsion of at least one polymeric silicone to about 70 to 80 parts of water, and preferably including a fractional part of a surfactant, as a first portion;
   adding at least about several parts of citrus juice to about 10 to 15 parts of lower alkanol, as a second portion; and
   mixing the first portion and the second portion together.

17. Polish formulating method according to claim 16, wherein the water of the first portion is at a temperature above ambient but nearer thereto than to the boiling temperature of water.

18. Polish formulating method according to claim 16, wherein the components of the second portion are mixed together at about ambient temperature.

19. Polish formulating method according to claim 16, wherein the second portion is mixed into the first portion.

20. Polish formulating method according to claim 16, wherein the predominant component of the polymeric silicone is polydimethylsiloxane.

21. Polish formulating method according to claim 16, wherein a minor part of the polymeric silicone material comprises a cross-linking amine-functional silicone polymer.

22. Formulating a polish composition having the characteristic of imparting a wet look to a motor vehicle to which applied and allowed to dry thereon without buffing, comprising the steps of mixing the following into about 70 to 80 parts of water:
   about 5 to 10 parts of polydimethylsiloxane emulsion,
   about 10 to 20 parts of water-miscible alkanol, and
   at least about several parts of lemon juice or extract thereof.

23. Polish formulating method according to claim 22, including mixing thereinto also about ½ to 1½ parts of at least one aqueous emulsion of cross-linking silicone polymer.

24. Polish formulating method method according to claim 23, wherein the polymer emulsions are mixed into the water first, and the other components are mixed together and then added to the aqueous mixture.

25. Polish formulating method according to claim 23, wherein the resulting mixture is made up of the following:
   about 10% to 20% of lower alkanol miscible with water,
   about 3% to 6% of silicone polymers measured water-free,
   about 3% to 4% of lemon juice concentrate, and the rest water.

26. Vehicle polish composition produced according to the formulating method of claim 16.

27. Wax-free vehicle polish composition produced according to the formulating method of claim 22.

28. Wax-free vehicle polish composition produced according to the formulating method of claim 25.

29. Method of shining a motor vehicle, comprising wiping onto it in effective amount the polish composition of claim 11.

30. Method of shining a motor vehicle, comprising wiping onto it in effective amount the polish composition formulated according to claim 22.

31. Wax-free vehicle-polishing composition, made up of water in major part, and comprising, in emulsified form:
  polymeric silicones to at most about ten percent, including
    about a half dozen percent of polydimethylsiloxane, and
    from about 1 to 2 percent of cross-linking amine-functional silicone polymer, and
    from about 1 to 2 percent of silicone polymer containing alkoxy, carboxy, or hydroxy substituents reactive with such amine-functional silicone polymer; and
  water-miscible alkanol to the extent of about 10 to 20 percent,
    comprising isopropanol in major part; and
  several parts of citrus juice concentrate equivalent to about several times as much juice,
  comprising lemon concentrate in major part.

32. In formulating the vehicle-polishing composition of claim 31, the steps of
  mixing such silicone polymers, pre-emulsified, into about 75 parts of water containing a fractional part of a surfactant, as a first mixture; and
  mixing together, as a second mixture, such alkanol and such citrus concentrate; and then
  adding the latter mixture to the former mixture; and finally
  adding enough water thereto to make up the total of 100 parts.

33. Method of shining a motor vehicle consisting essentially of wiping onto it the vehicle-polishing composition of claim 31.

34. Motor vehicle shined according to claim 33 to a wet look.

* * * * *